US011429645B2

(12) United States Patent
Menipaz et al.

(10) Patent No.: US 11,429,645 B2
(45) Date of Patent: Aug. 30, 2022

(54) MULTIPLE TAXONOMY BASED SEARCHING AND CATEGORIZATION

(71) Applicant: eBay Inc., San Jose, CA (US)

(72) Inventors: Amit Reuven Menipaz, Los Gatos, CA (US); Justin VanWinkle, San Jose, CA (US); Ishai Froind, San Jose, CA (US)

(73) Assignee: eBay Inc., San Jose, CA (US)

( * ) Notice: Subject to any disclaimer, the term of this patent is extended or adjusted under 35 U.S.C. 154(b) by 490 days.

(21) Appl. No.: 15/921,527

(22) Filed: Mar. 14, 2018

(65) Prior Publication Data

US 2019/0286740 A1 Sep. 19, 2019

(51) Int. Cl.
*G06F 16/28* (2019.01)
*G06F 16/248* (2019.01)
*G06F 16/9535* (2019.01)
*G06F 3/0482* (2013.01)

(52) U.S. Cl.
CPC .......... *G06F 16/287* (2019.01); *G06F 16/248* (2019.01); *G06F 16/9535* (2019.01); *G06F 3/0482* (2013.01)

(58) Field of Classification Search
CPC .. G06F 16/287; G06F 16/248; G06F 16/9535; G06F 3/0482; G06F 16/954; G06F 16/338; G06F 16/951; G06F 16/24578; G06F 16/353; G06F 16/9038; G06F 16/285; G06F 16/355; G06F 16/9538; G06F 16/93; G06F 16/958; G06F 16/35; G06F 16/90335; G06F 16/358; G06F 16/2465; G06F 16/374; G06F 16/36; G06F 16/738
See application file for complete search history.

(56) References Cited

U.S. PATENT DOCUMENTS

| | | | |
|---|---|---|---|
| 6,625,619 B1 * | 9/2003 | McClendon | G06F 16/954 |
| 6,816,858 B1 * | 11/2004 | Coden | G06F 16/748 |
| | | | 707/750 |
| 7,788,265 B2 * | 8/2010 | Morscher | G06F 16/353 |
| | | | 707/956 |
| 8,117,231 B2 | 2/2012 | Seamon | |
| 8,498,906 B2 | 7/2013 | Zmolek | |
| 8,738,627 B1 * | 5/2014 | Khoshnevisan | G06F 16/954 |
| | | | 707/738 |
| 8,849,828 B2 | 9/2014 | Pandit et al. | |
| 9,324,082 B2 | 4/2016 | Johnson et al. | |
| 9,785,678 B1 * | 10/2017 | Peery | G06F 16/24578 |

(Continued)

OTHER PUBLICATIONS

Hull, "Clade—A Freely Available, Open Source Taxonomy And Autoclassification Tool", Retrieved from the Internet: URL: <http://www.flax.co.uk/blog/2012/06/12/clade-a-freely-available-open-source-taxonomy-and-autoclassification-tool/>, Jun. 12, 2012, pp. 1-10.

*Primary Examiner* — Vincent F Boccio
*Assistant Examiner* — Andalib F Lodhi
(74) *Attorney, Agent, or Firm* — Holland & Hart LLP

(57) ABSTRACT

An item query can be received on a website that manages a diverse set of items. If the query is associated with a custom taxonomy, the custom taxonomy for the item (or item class) is used to create a user interface with navigational elements generated from the custom taxonomy. The custom taxonomy can be generated from a third-party site that is associated with the item (e.g., a manufacturer). The generated user interface allows users to more readily navigate items from the item class.

20 Claims, 10 Drawing Sheets

(56) References Cited

U.S. PATENT DOCUMENTS

| | | | | |
|---|---|---|---|---|
| 2007/0067279 A1* | 3/2007 | Bonabeau | ............ | G06F 16/951 |
| 2007/0226195 A1* | 9/2007 | Huck | ................... | G06F 16/954 |
| 2012/0117050 A1* | 5/2012 | Vasudevan | ............ | G06F 16/367 |
| | | | | 707/777 |
| 2012/0310781 A1* | 12/2012 | Battle | ................ | G06Q 30/0627 |
| | | | | 705/26.63 |
| 2015/0310058 A1* | 10/2015 | Kraft | ................... | G06F 16/951 |
| | | | | 707/758 |

* cited by examiner

MULTIPLE TAXONOMY BASED SEARCHING AND CATEGORIZATION

TECHNICAL FIELD

Embodiments of the present disclosure relate generally to search engines and, more particularly, but not by way of limitation, to multiple taxonomy-based search systems.

BACKGROUND

Users can browse a website using a hierarchy that categorizes information on the website. For example, the hierarchy can include interactive elements, e.g., hyperlinks, configured to navigate to pages showing a given category of information. The items of information within a given category are often stored in databases (e.g., SQL-based relational databases), which can be used to retrieve data on-the-fly in response to a page request. However, when the information to be categorized has a diverse set of characteristics (e.g., different types of physical items such as cameras of different makes, running shoes, kitchen appliances), the database scheme applied often uses broad categories in order to reference entire classes of items. The broad categories result in a loss of granularity that causes users to navigate through a broadly categorized returned set of data, sifting through each item in search of the item they seek. However, simply using narrower categories can create an unmanageable database scheme in which the quantity of narrow categories sprawls in order to categorize a given diverse dataset.

BRIEF DESCRIPTION OF THE DRAWINGS

Various ones of the appended drawings merely illustrate example embodiments of the present disclosure and should not be considered as limiting its scope.

FIG. 7 shows a user interface of a website showing search results for a queried item, according to some example embodiments.

DETAILED DESCRIPTION

Figure 1:
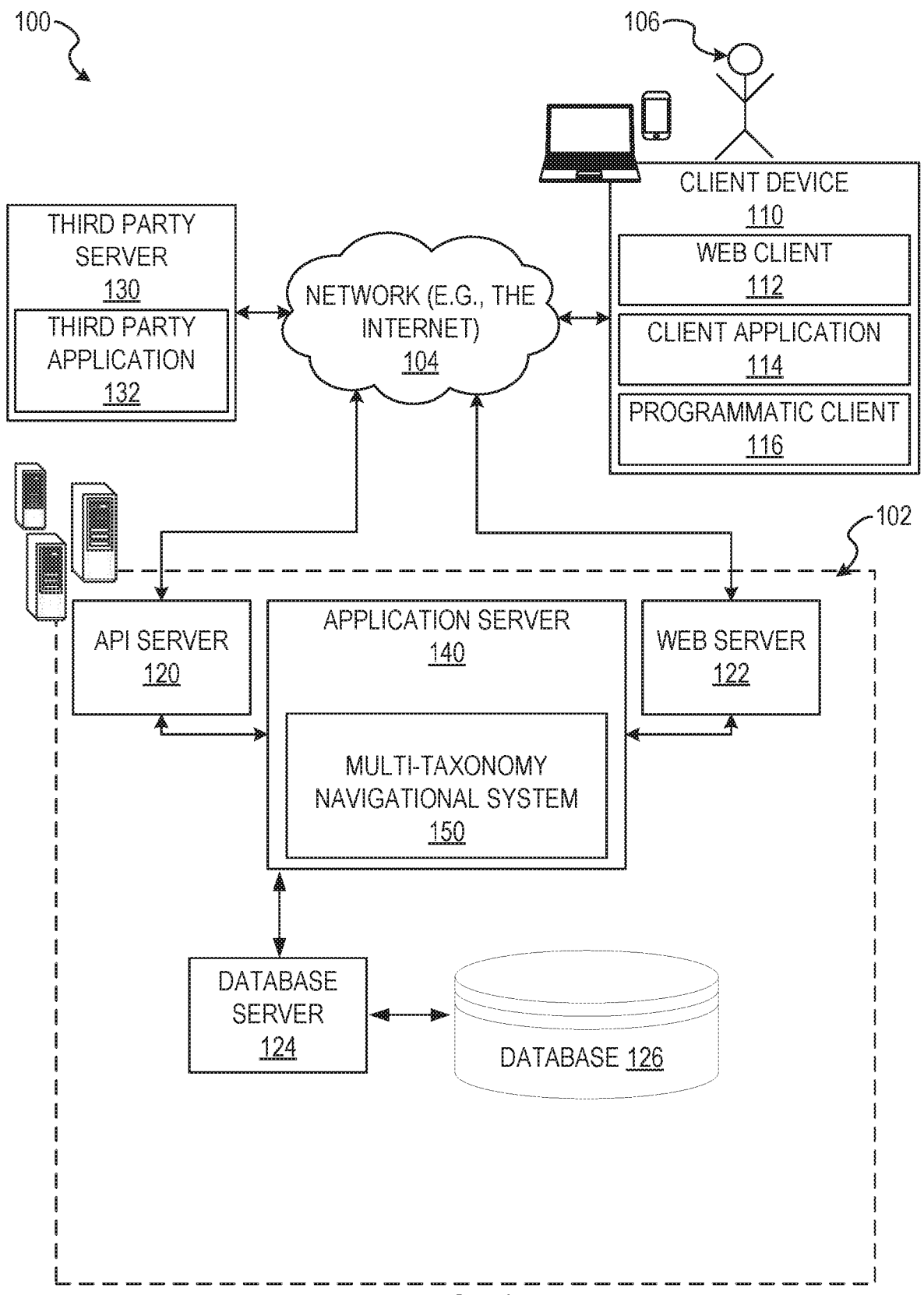
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A website that has complete control over which data items are published to the website can create a highly structured database that categorizes the data items in functional, easy to use schemes. For example, a social media site may create pre-set formats for data items such as posts, articles, and so forth, so that it is easier to categorize and store the data items in an underlying database. How easy it is for users to use a frontend of a website (e.g., user interfaces (UIs)) often depends on how well the backend (e.g., databases) is organized. However, if the set of data items is very diverse (e.g., listings for tennis shoes, listings for multi-processor computer chips, listings for catalytic converters, listings for Radiohead concert tickets) the task of categorizing the data in the database and creating easy to use UIs on the front end becomes very difficult. The problem is exacerbated when the website allows its website users to categorize the items themselves and then publish listings using the self-categorized items on the website. One conventional approach may be to create broad categories for the items. However, the broad categories often poorly describe niched categories of items. For example, a toy building block company (e.g., Lego®) may create a wide range of building blocks in many different shapes, colors, and styles. A user browsing the website to search for specific types of blocks (e.g., "bricks with a slope", "angled bricks") may be presented with the category of "Construction Toys". While the category does describe the specific building blocks, the category is blind to the niched attributes of blocks from a certain company. As such, the user clicks on the "construction toys" category and is forced to sift through each listing looking for the specific block type. Simply adding a "blocks with a slope" category may not be practical because it creates too narrow of a category. If each niched item received its own category, the underlying database scheme would sprawl to the point of being difficult to use and unmanageable.

To this end, a multiple taxonomy system can be configured to receive an item query on a website that manages a diverse set of items and supports user categorized listings. The multiple taxonomy system can determine whether the queried item is associated with a custom taxonomy that uniquely categorizes the class to which the queried item belongs. For example, if the queried item is the manufacturer of toy building blocks (e.g., Lego®), the custom taxonomy that has niched categories is identified and retrieved. The custom taxonomy can then be used to generate a display of search results that can be navigated using the categories of the custom taxonomy (e.g., "bricks with a slope" UI filter element, "angled bricks" UI filter element). If the queried item is not associated with a custom taxonomy, then the site-wide taxonomy system for the platform (e.g., website) may be used instead.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), a client application 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more applications (also referred to as "apps") such as, but not limited to, web browsers, book reader apps (operable to read e-books), media apps (operable to present various media forms including audio and video), fitness apps, biometric monitoring apps, messaging apps, and electronic mail (email) apps. In some implementations, the client application 114 includes various components operable to present information to the user (e.g., the user 106) and communicate with the networked system 102.

The web client 112 accesses the various systems of the networked system 102 via the web interface supported by a web server 122. In some example embodiments, the web server 122 hosts a public facing website (e.g., accessible to the user 106 using his/her client device 110 through the network 104). The website is configured to publish items listings and receive queries for the published item listings. The programmatic client 116 and client application 114 access the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application servers 140. The application server 140 can host a multi-taxonomy navigational system 150, which can comprise one or more modules or applications, each of which can be embodied as hardware, software, firmware, or any combination thereof. The application server 140 is, in turn, shown to be coupled to a database server 124 that facilitates access to one or more information storage repositories, such as database 126. In an example embodiment, the database 126 comprises one or more storage devices that store information to be accessed by the multi-taxonomy navigational system 150 or client device 110. Additionally, a third-party application 132, executing on a third-party server 130, is shown as having programmatic access to the networked system 102 via the programmatic interface provided by the API server 120. For example, the third-party application 132, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 (e.g., the multi-taxonomy navigational system 150) can also be implemented as standalone software programs, which do not necessarily have networking capabilities.

Figure 2:
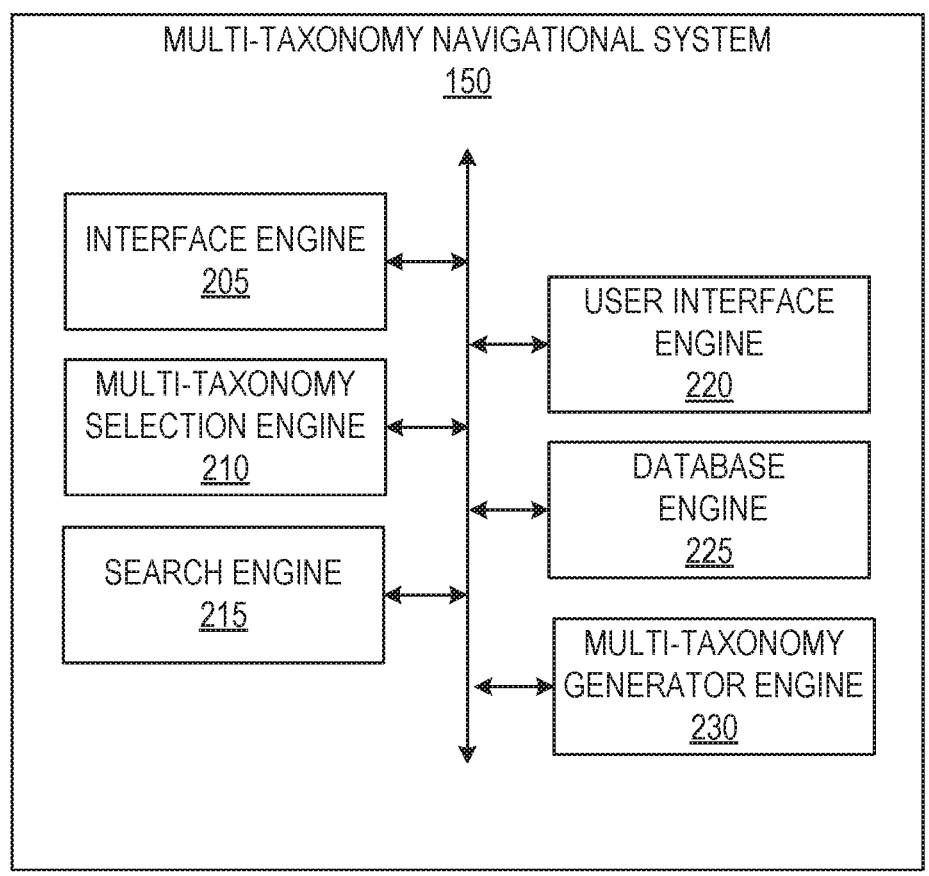
FIG. 2 is a block diagram showing example components provided within the multi-taxonomy system of FIG. 1, according to some example embodiments.

FIG. 2 illustrates a multi-taxonomy navigational system 150 showing example functional engines, according to some example embodiments. As illustrated, the multi-taxonomy navigational system 150 comprises an interface engine 205, a multi-taxonomy selection engine 210, a search engine 215, a user interface engine 220, a database engine 225, and a multi-taxonomy generator engine 230. The components themselves are communicatively coupled (e.g., via appropriate interfaces) to each other and to various data sources so as to allow information to be passed between the applications or so as to allow the applications to share and access common data. Furthermore, the components access the database 126 via the database server 124.

The interface engine 205 manages receiving search queries for items on a network site, e.g., a website. The multi-taxonomy selection engine 210 is configured to determine whether an item listed in a given query is associated with a custom UI taxonomy. The search engine 215 is configured to use the item mentioned in the query to search for matching listings. In some example embodiments, the search engine 215 implements Apache Lucene to search an inverted index to find matching listings. It is appreciated that by matching listings, listings can be for the item dimension in the query or for accessories of the item mentioned in the query.

The user interface engine 220 is configured to generate a user interface that shows the search engine results, e.g., the listings that match the item, with the custom UI taxonomy associated with the item. The database engine 225 is configured to retrieve listing data from a database to populate the user interface generated by the user interface engine 220. In some example embodiments, the database engine 225 is a programmatic interface that communicates with the database server 124 to retrieve data from the database 126.

Figure 3:
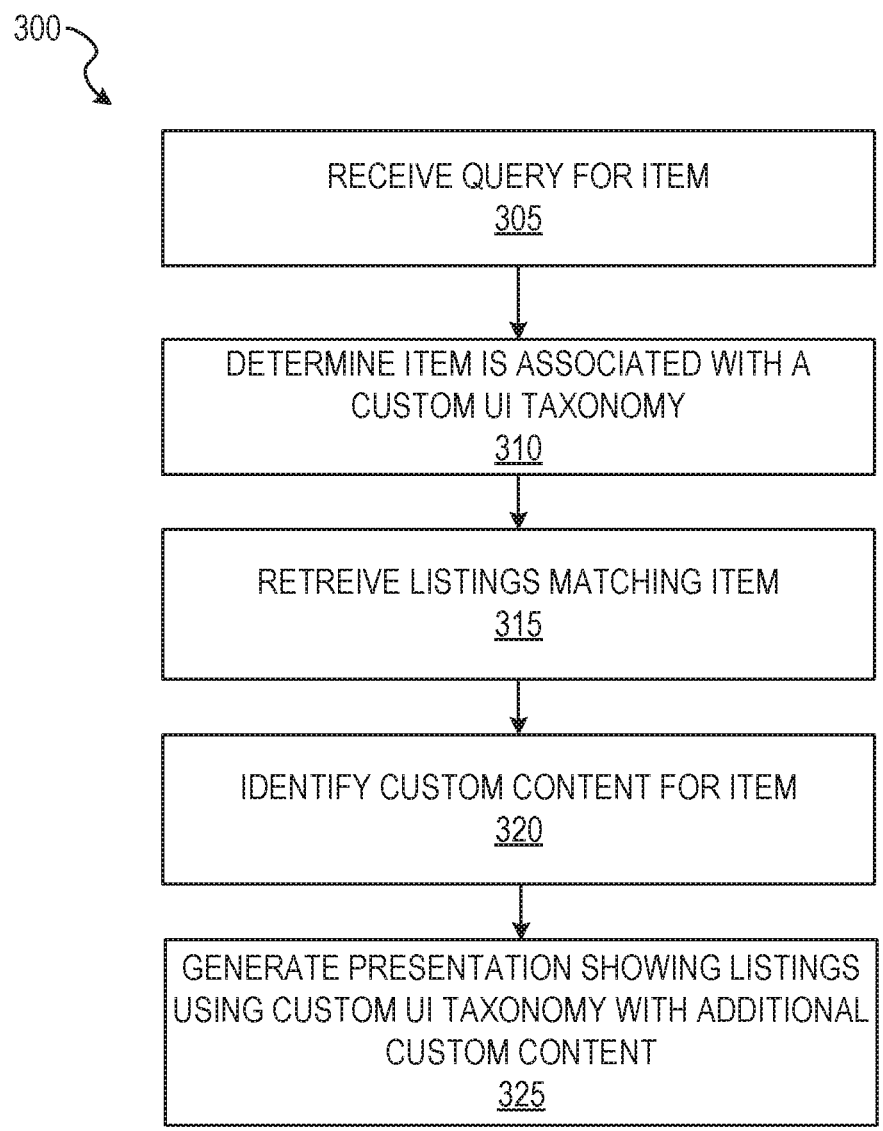
FIG. 3 shows a flow diagram of a method for implementing multiple taxonomy based searches, according to some example embodiments.

FIG. 3 shows a flow diagram of a method 300 for implementing multiple taxonomy navigation-based searches, according to some example embodiments. At operation 305, the interface engine 205 receives a query for an item of a given make (e.g., brand). In some example embodiments, the query is received as text input by a user into a search bar. Alternatively, according to some example embodiments, the query is generated by the user selecting a given image or UI element on a page. For example, a page may display a plurality of images, including an image of camera_type_A, an image of camera_type_B, and an image of camera_type_C, where the types are makes (e.g., item classes or brands of a company). If the user selects the image of camera_type_B, a query is auto-generated by the script of the page as a search request for items in a database that match "camera_type_B", as discussed in further detail below with reference to FIGS. 6-8.

At operation 310, the multi-taxonomy selection engine 210 determines whether the item in the query is associated with a custom taxonomy. For example, when a given item is queried, the multi-taxonomy selection engine 210 checks a lookup table to determine whether the item is of a make (e.g., brand of a manufacturer) associated with a custom taxonomy. The lookup table can indicate whether or not the item is associated with a custom taxonomy and may further reference the location of tables or data (e.g., additional content such as video data, live stream data, catalog data) that is used to generate a custom taxonomy in a user interface (e.g., a custom UI taxonomy). In some example embodiments, the data indicating whether an item model (e.g., "iPhone 6 plus") or item class (e.g., "Apple iPhones", "Apple") is associated with a custom taxonomy is stored in an existing data structure. For example, in a relational database scheme, additional columns can be appended to an existing items table to track the data that would be tracked in the lookup table, as discussed in further detail below with reference to FIG. 9.

At operation 315, the search engine 215 retrieves listings matching the queried item. In some example embodiments, the search engine 215 queries a database using structured query language (SQL) to retrieve listings that match key terms in the query. In some example embodiments, the search engine 215 implements an inverted index based distributed search engine (e.g., Apache Lucene) to retrieve listings that have text similar to text in the query.

At operation 320, the multi-taxonomy selection engine 210 identifies custom content for the queried item. For example, the custom content may include thumbnails to other network sites, links configured to download PDF guides about the item or item class, video frames that place video about the item or item class, or modules that update live content from the Internet associated with the item (e.g., a social media feed of the company that manufactures the item or item class).

At operation 325, the user interface engine 220 generates a presentation showing the listings returned by the search engine 215 along with the custom UI taxonomy for the queried item and the custom content. The customer UI taxonomy is configured to filter the returned listings using new categories at a finer granularity or attribute unique to the custom item, as discussed in further detail below with reference to FIGS. 6-9.

Figure 4:
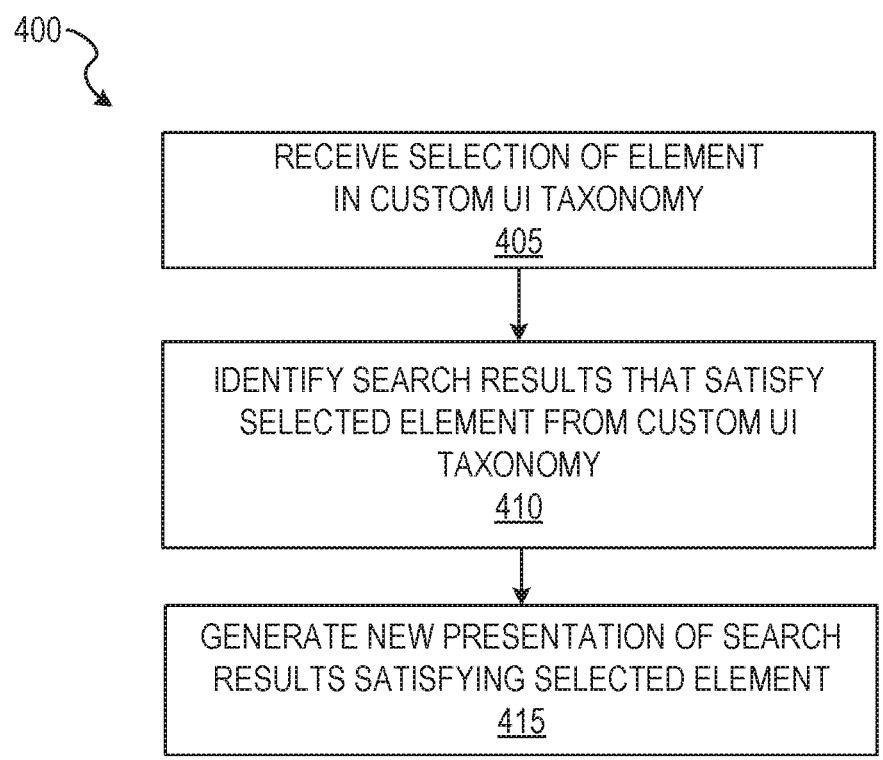
FIG. 4 shows a flow diagram of a method modifying search results using the custom UI taxonomy, according to some example embodiments.

FIG. 4 shows a flow diagram of a method 400 modifying search results using the custom UI taxonomy, according to some example embodiments. At operation 405, the user interface engine 220 receives selection of an element in the custom UI taxonomy. For example, the user 106 may select a new category displayed in the custom UI taxonomy. At operation 410, the search engine 215 retrieves search results that satisfy the selected element from the custom UI taxonomy. For example, if the selected element is "Hockey", the search engine 215 may search or otherwise filter within the retrieved results for items that are hockey related or otherwise have been pre-categorized (in metadata) as being related to hockey. Further, in some example embodiments, the search engine 215 performs a new search for listings that match the new search parameters. For example, the search engine 215 may use an inverted index-based search engine to search for additional listings that include the term "hockey" and the name, model, or make of the queried item.

At operation 415, the user interface engine 220 generates a new presentation of the search results. The new presentation of the search results may display filtered listings of the original search results (e.g., listings that match "hockey" within the originally returned listings of operation 315 of FIG. 3). Further, the new presentation may also include new listings found using the inverted index-based search.

Figure 5:
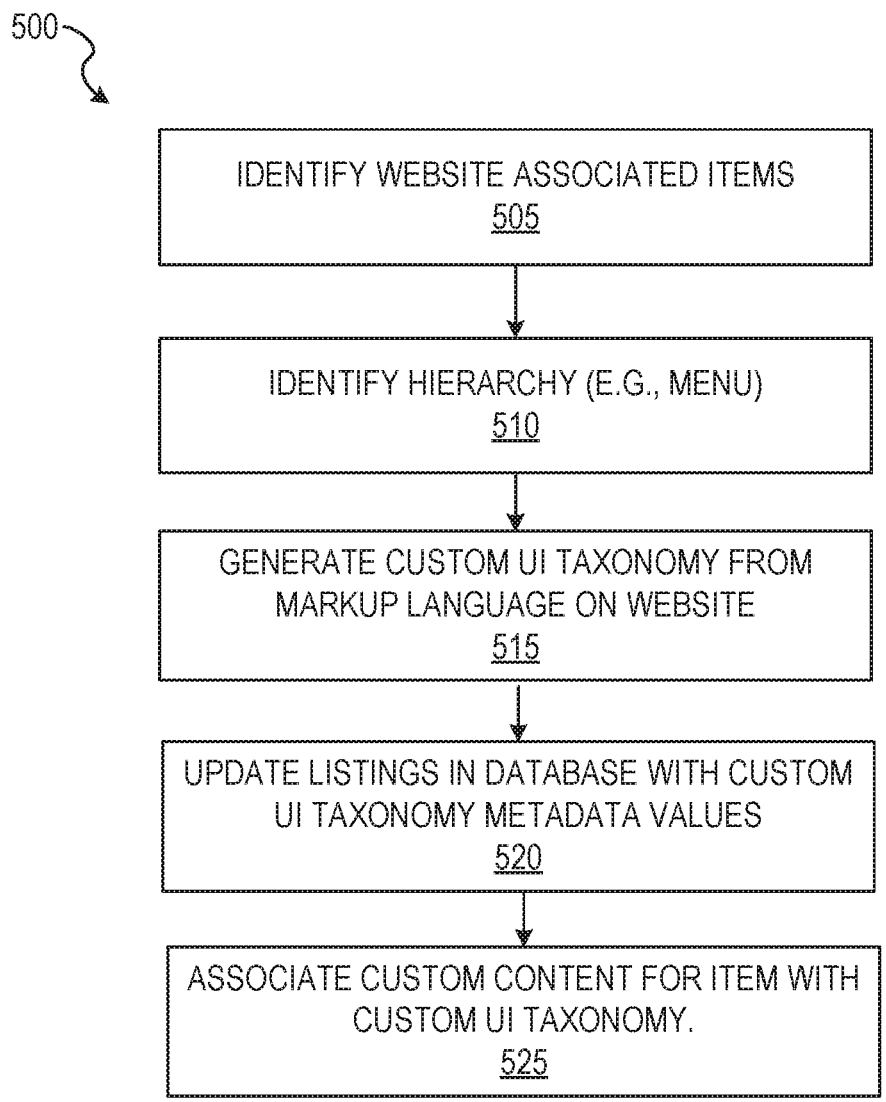
FIG. 5 shows a flow diagram of a method generating a custom taxonomy, according to some example embodiments.

FIG. 5 shows a flow diagram of a method 500 generating a custom taxonomy, according to some example embodiments. The custom taxonomy may be based on a custom taxonomy displayed as a navigation menu on a website of the manufacturer of a given item. For example, assume a camera manufacturer hosts a website that displays information about items it manufactures, with a navigation menu configured to navigate to different pages of the website. The manufacturer has the benefit of knowing what features are important to its customer base. Accordingly, the manufacturer can generate a navigational menu on the website that captures important or unique attributes of its items. The manufacturer's expertise of how its users would like to navigate its catalog of items can be captured by generating a custom UI taxonomy supported by a specially configured database. The custom UI taxonomy can then be used to allow navigation of items from the manufacturer in an approach that uses narrower but highly relevant categories.

Returning to method 500, at operation 505, the multi-taxonomy generator engine 230 identifies a website associated with the one or more items. As an example, the one or more items may be different types of compact sport-oriented cameras and the website may be the manufacturer website of the different models of the sport-oriented cameras. At operation 510, the multi-taxonomy generator engine 230 identifies a hierarchy on the website. For example, the multi-taxonomy generator engine 230 identifies a navigation menu on the website by recognizing the underlying markup language. For example, a menu on the website may have the following HTML code:

```
:::::::::::CODE BEGIN:::::::::::
    <section id="navbar">
        <ul>
            <li><a href="null"> By Activity
                <ul>
                    <li><a href="link to page"> Biking </a></li>
                    <li><a href="link to page"> Hockey </a></li>
                    <li><a href="link to page"> Skating </a></li>
                    <li><a href="link to page"> Surfing </a></li>
                </ul></a></li>
            <li><a href="#"> Mounts
                <ul>
                    <li><a href="link to page"> Body Mount </a></li>
                    <li><a href="link to page"> Helmet Mount </a></li>
                    <li><a href="link to page"> Suction Cup </a></li>
                    <li><a href="link to page"> Hand Grip </a></li>
                </ul></a></li>
            <!-- Additional Categories Here -->
        </ul>
:::::::::::CODE END:::::::::::
```

The menu code describes two categories that are likely unique to the items from that manufacturer, in that customer's request, for items having attributes of that category. In particular, for example, users may request cameras suitable for a given category. Thus, the manufacturer lists a "By Activity" category, which has attributes (sub-categories) for different activities, such as hockey and surfing. As a further example, users may request cameras that come with a certain type, or are otherwise compatible with a certain type, of mount. For example, a motorcycle enthusiast may try to navigate to cameras that are easily mountable on his/her motorcycle helmet. Although only two categories are shown, one of ordinary skill in the art appreciates that the menu may have multiple categories, with children categories, which can in turn can have sub-children categories, and so forth. Further, although the example discussed above uses a navigation menu, other hierarchies can be used. For example, the hierarchy may be taken from a product catalog, table of contents, or other schema found on websites or documents (e.g., PDFs, guides, whitepapers) of the manufacturer. Further, according to some example embodiments, the hierarchy is assembled manually by the manufacturer and transmitted to the multi-taxonomy generator engine 230 (e.g., via upload) for use as a custom taxonomy for items of the manufacturer.

At operation 515, the multi-taxonomy generator engine 230 generates a custom UI taxonomy from the markup language of the custom taxonomy on the website. The custom UI taxonomy is a specification of lists and sub-lists describing how to categorize items from the manufacturer. A custom UI taxonomy can be used to create navigation elements on different platforms (e.g., websites using HTML, mobile apps written in different codes, such as Objective-C or Java) using database support as discussed in further detail below with reference to FIGS. 8 and 9.

At operation 520, the multi-taxonomy generator engine 230 updates listings of items in a database with the custom UI taxonomy metadata values. The metadata values associate items in a listing in the database with the new categories in the custom UI taxonomy. For example, the metadata specifies which item listings should be returned if the user selects "Hockey" in the new custom UI taxonomy. In some example embodiments, the metadata values are stored in a table separate from the tables that manage a given platform's (e.g., website, database, mobile app) item data or item catalog. In some example embodiments, columns are appended to existing database tables of a given platform and the metadata values are stored in the newly formed columns.

At operation 525, the multi-taxonomy generator engine 230 associates custom content of the item with the custom UI taxonomy. The custom content is additional content generated by the manufacturer for inclusion in a display search result listings. The custom content can include video data, image data, document data, or live Internet data. Further details of additional content are discussed with reference to FIG. 8.

Figure 6:
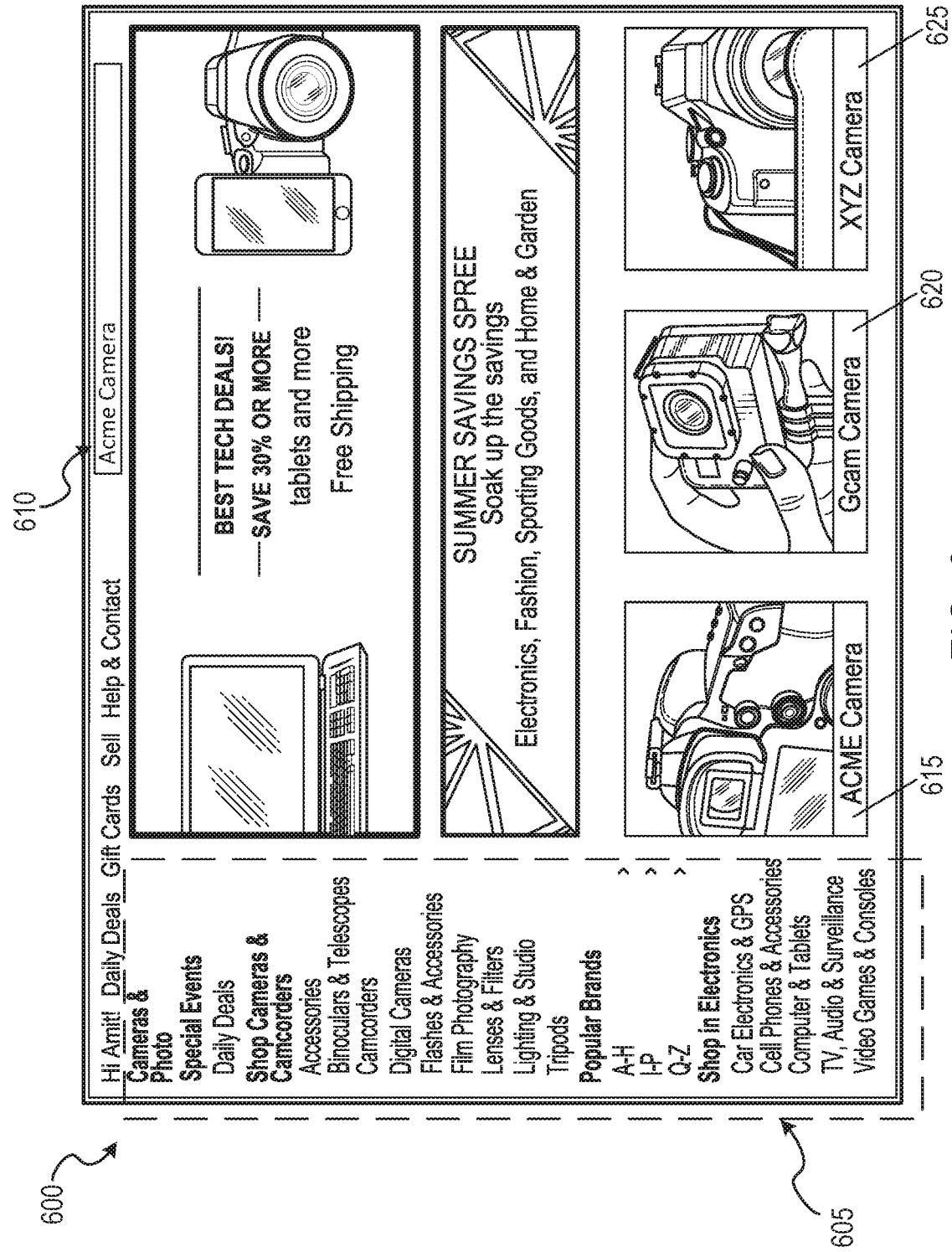
FIG. 6 shows a user interface of a website for submitting a query, according to some example embodiments.

FIG. 6 shows a user interface 600 of a website for generating a query, according to some example embodiments. As illustrated, the user interface 600 includes a navigation menu 605, a search bar 610 (an example of a UI search element), and a plurality of item images 615-625 of different makes (manufacturer brands). Queries can be generated using the user interface 600 by inputting search terms into a search bar 610. For example, as displayed in FIG. 6, a user has input the search term "Acme Camera" into the search bar 610. In some example embodiments, queries are generated when a user selects one of the plurality of item images 615-625. For example, the user can select the Acme Camera image 615, which causes the user interface 600 (e.g., a script of the user interface 600, or server side code connected to the user interface 600) to initiate a query for "Acme Cameras" cameras.

Figure 7:
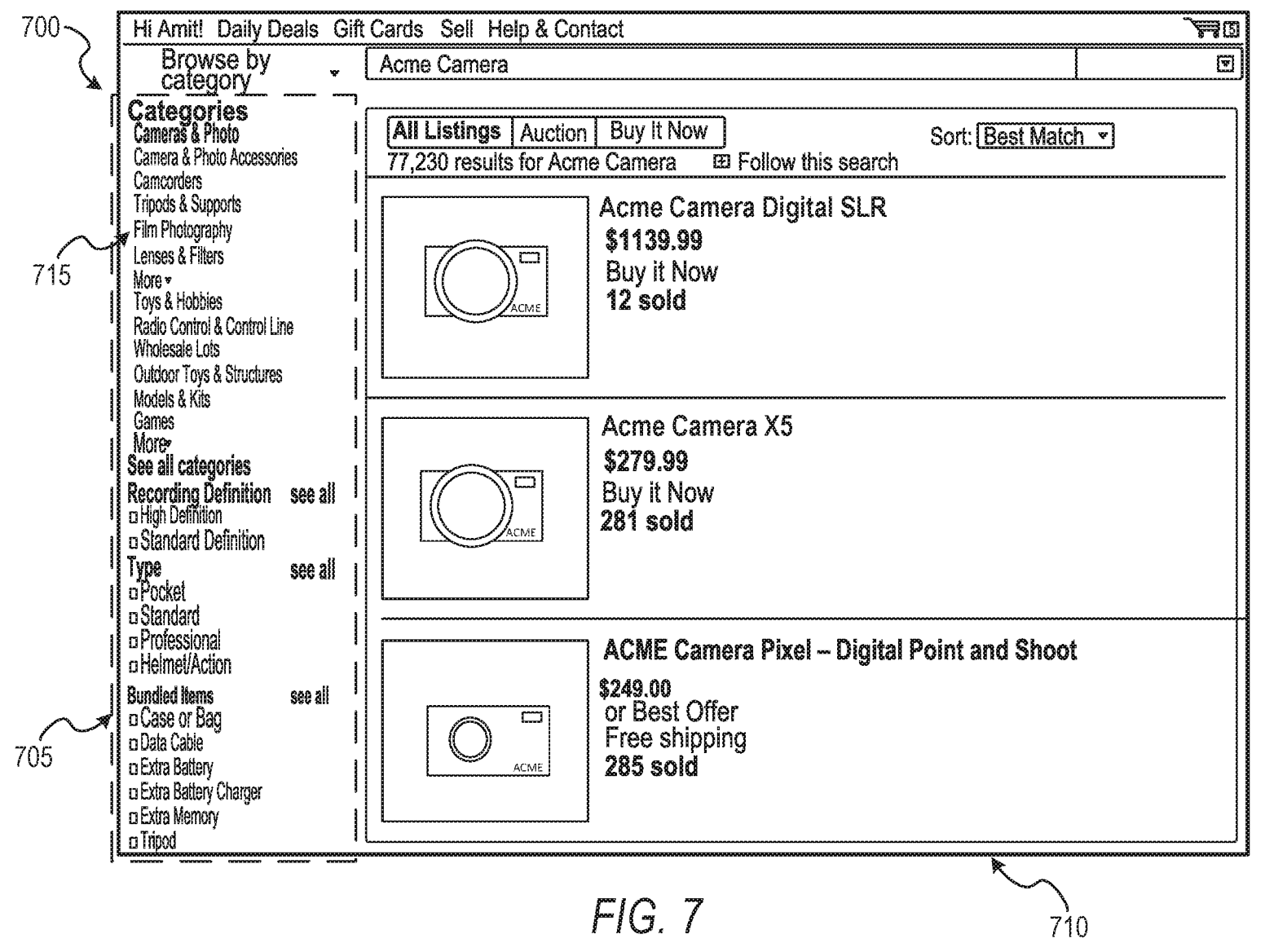

FIG. 7 shows a user interface 700 of a website showing search results for a queried item, according to some example embodiments. Continuing the example above, the user interface 700 shows search results for listings of Acme Camera items (e.g., assuming the user selected the Acme Camera image 615 in FIG. 6). As illustrated, the user interface 700 includes a general taxonomy 705, and search results 710 for Acme camera items. The general taxonomy 705 has been generated using a site-wide taxonomy that is generally used to categorize diverse sets of data on the website, e.g., items of different item classes including models and makes. As such, some of the categories may not adequately narrow down on features or attributes of the Acme camera class. Further, some of the categories may be wholly irrelevant to the Acme camera class of items. For example, if Acme is a company that manufactures only digital cameras, then the film photography element 715 does not apply to the search results, yet is still included because "film photography" is part of the site-wide taxonomy system.

Figure 8:
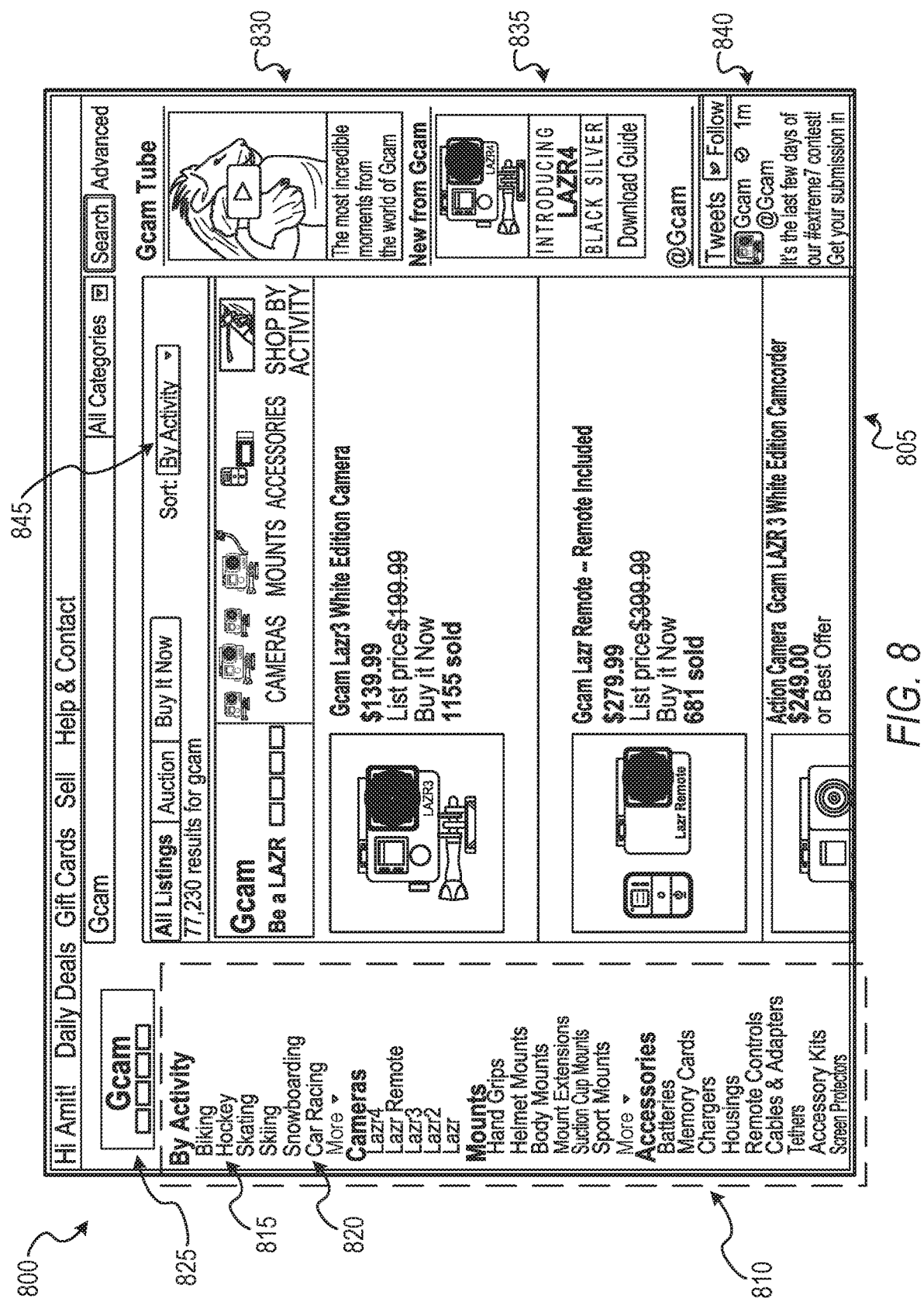
FIG. 8 shows a user interface of a website showing search results for a queried item with a custom taxonomy, according to some example embodiments.

FIG. 8 shows a user interface 800 of a website showing search results for a queried item with a custom taxonomy, according to some example embodiments. In particular, user interface 800 shows an example result of the method 300 (FIG. 3) being performed in response to a user querying an item that is associated with a custom taxonomy.

As illustrated in FIG. 8, the user interface 800 displays search results 805 for the queried item "Gcam" (e.g., by selecting the Gcam Camera image 620 in FIG. 6). In the example illustrated, "Gcam" refers to the make (e.g., brand) from the manufacturer or company called "Gcam". The search results 805 include different item listings for different models of a "Lazr" camera-type, which is a line of compact sport-oriented cameras made by "Gcam". The user interface 800 further displays a custom UI taxonomy 810 (implemented as a navigational menu). The custom UI taxonomy 810 has categories that are specific to items made by "Gcam", or otherwise specific to the "Lazr" line of items. For example, the custom UI taxonomy 810 contains the "By Activity" category, which is a category not included in the site-wide taxonomy. The custom UI taxonomy 810 allows a user searching for "Gcam" items on the website to more easily navigate to relevant items.

For example, a user may select the "Hockey" element 815 and the search results 805 may be filtered to only return results that have been pre-associated with the hockey sub category of the custom UI taxonomy 810. For instance, if the "Hockey" element 815 is selected, the second listing in the search results 805 (titled, "Gcam Lazr Remote—Remote Included") would be removed, as it is a Gcam model that uses a remote and hockey players (e.g., users that play hockey and selected the "Hockey" element 815) wear gloves to play hockey and thus would not be interested in the second item listing as it is difficult to operate a remote using hockey gloves.

As a further example, a user may select the "Car Racing" element 820 and the search results may be filtered to only return results that have been pre-associated with the car racing sub-category of the custom UI taxonomy 810. In this example, the first and third item listings in the search results 805 would be removed, leaving the second item listing (the remote control Lazr model) in the search results 805. The underlying rationale may be that car racing users often externally mount cameras on their cars and use the remotes to control the externally mounted cameras. The other elements in the custom UI taxonomy 810 (e.g., cameras category, mounts category, accessories category) may likewise be used to filter or otherwise search for results.

Custom content has been integrated into different areas of the user interface 800, according to some example embodiments. In particular, for example, a logo 825 of the manufacturer has been inserted above the custom UI taxonomy 810. Further, the left sidebar contains video custom content item 830 (e.g., a video feed created by the manufacturer), document a custom content item 835 (e.g., an article or guide in PDF or web form), and Internet-connected custom content item 940 (e.g., a plug-in module that pulls content such as tweets from social media posts of the manufacturer). The custom content (e.g., logo 825, and custom content items 830-840) work in concert with the custom UI taxonomy 810 to provide a look-and-feel scheme of navigating for items of a given make on the manufacturer's website.

Although the custom UI taxonomy 810 in FIG. 8 is implemented as a side-bar menu type, the custom taxonomy can be used to manipulate item data in other ways as well. For example, a sort UI element 845 can be configured using the custom taxonomy to filter search results using the custom taxonomy categories (e.g., "By Activity").

Figure 9:
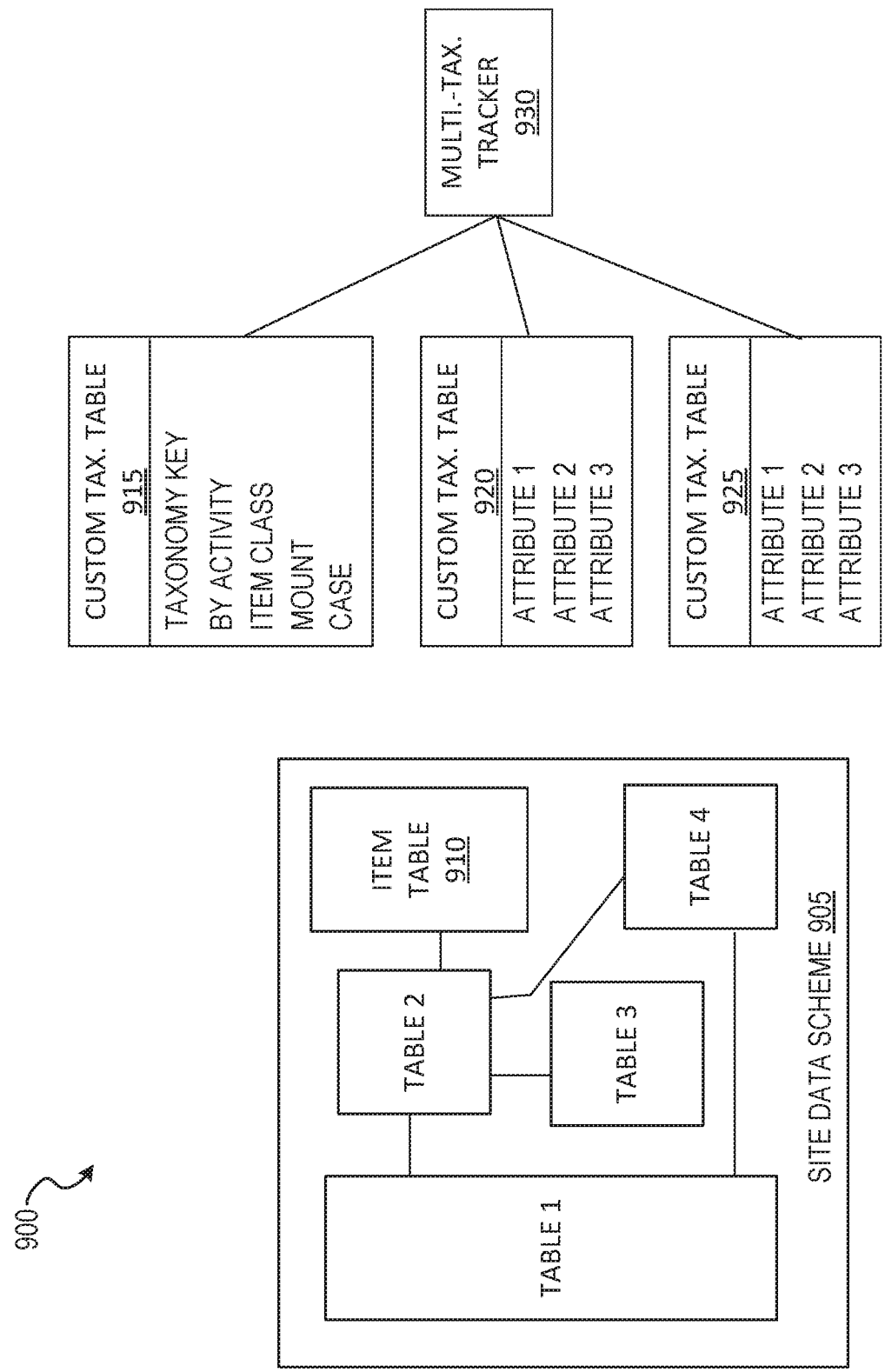
FIG. 9 shows a memory architecture used for implementing a custom taxonomy, according to some example embodiments.

FIG. 9 shows a memory architecture 900 used for implementing a custom taxonomy, according to some example embodiments. As discussed, the site-wide taxonomy is used to store item data in a database for use across a website. To enable custom taxonomy approaches discussed above, additional data items (e.g., tables, columns) can be added to the existing memory scheme of a given platform (e.g., website). The memory architecture 900 shows an example of data arranged in memory accessible to the multi-taxonomy navigational system 150 (e.g., internal memory, database memory, memory portions distributed across nodes). In the example illustrated, the site-wide data scheme is implemented as a number of tables (e.g., table 1, table, 2, table 3, table 4) in the site data scheme 905.

The tables can include user information, listing information, and data about items. For example, one or more of the tables, e.g., item table 910, may store item information such as item make, model, title, descriptive terms, item specs (e.g., memory size, screen size, processor type, shoe type, shirt type, shirt color). When a query is received, the multi-taxonomy selection engine 210 checks a lookup table, such as the multiple taxonomy tracker 930, to determine whether the queried item is of a make that has a custom taxonomy. For example, if a manufacturer name (e.g., Gcam) or item class (e.g., Lazr) is queried, the multi-taxonomy selection engine 210 checks the multiple taxonomy tracker 925 to determine that Apple is a manufacturer for which its items have been associated with a custom taxonomy (e.g., a custom taxonomy created from the Gcam website).

In some example embodiments, the multiple taxonomy tracker 930 links all models, types, brands or otherwise descriptive language of an item with a taxonomy ID. That is, the multi-taxonomy selection engine 210 can search "Gcam" within the multiple taxonomy tracker 930 to find a taxonomy ID, which further references custom taxonomy table 915. Alternatively, the multi-taxonomy selection engine 210 may also search within multiple taxonomy tracker 930 for "Lazr" (which references a line of items) or "Lazr3" (a specific model) and find the same taxonomy ID, which further references the custom taxonomy table 915.

The custom taxonomy table 915 is a schema that can be used to generate the custom taxonomy, e.g., the custom UI taxonomy 810. The custom taxonomy table 915 may further reference locations of custom content (e.g., video, logos) to display when item listings of the manufacturer are listed, as discussed with reference to FIG. 8 above.

The multiple taxonomy tracker 930 may further reference additional custom taxonomy tables, each of which may store a custom taxonomy for different manufacturers. For example, custom taxonomy table 915 may be a custom taxonomy customized to more easily reference difficult to describe types of Lego blocks from Lego, a manufacturer of building toys. As a further example, the custom taxonomy table 920 may be a custom taxonomy customized to reference different types of Pez dispensers, and so on. The custom taxonomy may be generated from users that specialize in the items. For example, the custom taxonomy may be generated from a wiki table of contents guide of a wiki-site maintained by Pez dispenser enthusiasts.

If the multi-taxonomy selection engine 210 receives a query and determines that the queried item is not associated with a custom taxonomy (e.g., by checking the multiple taxonomy tracker 930), the multi-taxonomy selection engine 210 then implements the site-wide taxonomy stored using item table 910 and/or additional tables (e.g., table 2, table 3, etc.) to generate a general taxonomy, e.g., general taxonomy 705 as illustrated in FIG. 7.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 3-5 are implemented in some embodiments in the context of a machine and an associated software architecture. The sections below describe representative software architecture and machine (e.g., hardware) architecture that are suitable for use with the disclosed embodiments.

Figure 10:
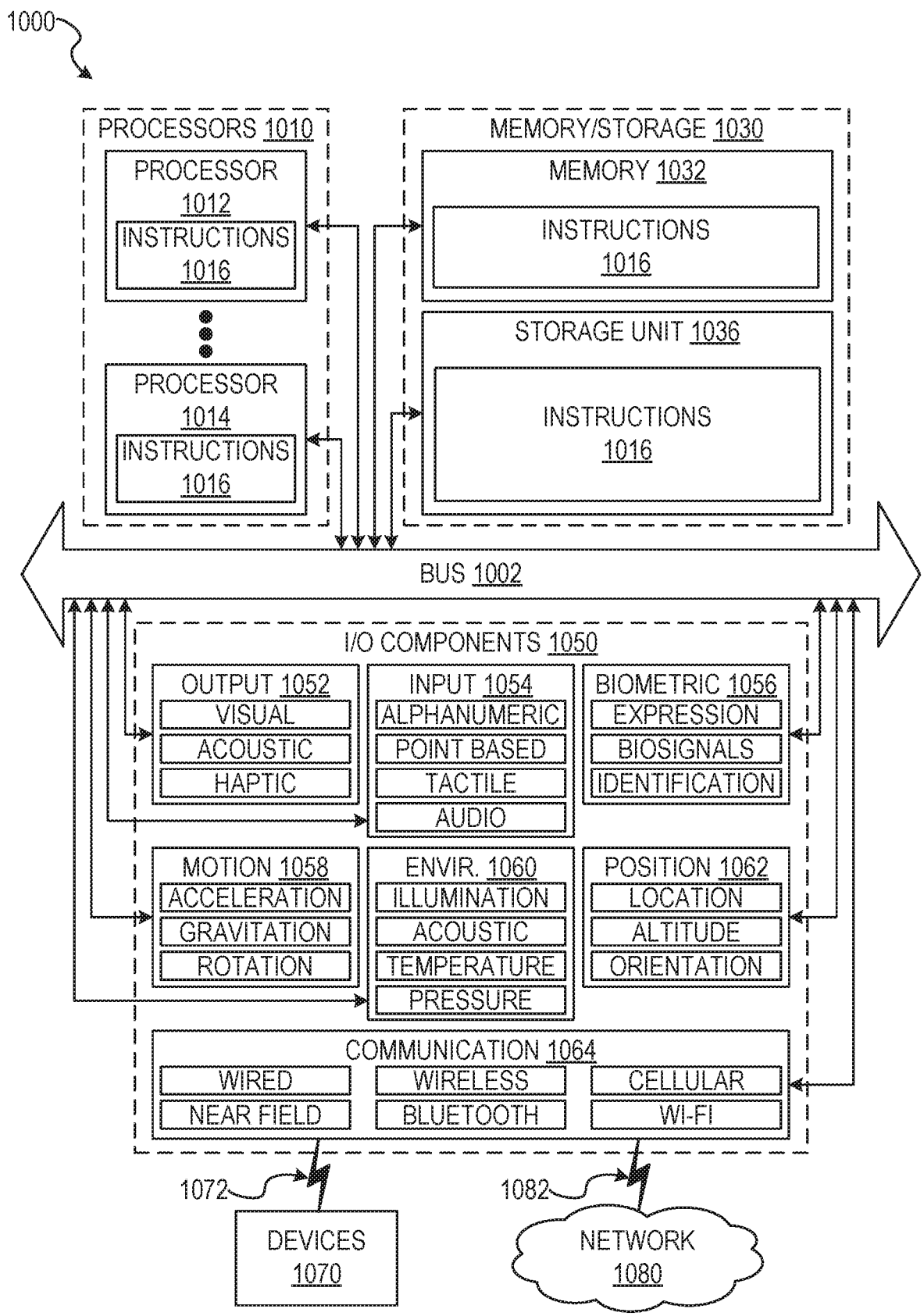
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 can cause the machine 1000 to execute the flow diagrams of FIGS. 3-5. Additionally, or alternatively, the instruction 1016 can implement the engines of FIG. 2, and so forth. The instructions 1016 transform the general, non-programmed machine into a particular machine programmed to carry out the described and illustrated functions in the manner described. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1012 and processor 1014 that may execute instructions 1016. The term "processor" is intended to include a multi-core processor that may comprise two or more independent processors 1012, 1014 (sometimes referred to as "cores") that can execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 can include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1050 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 can detect identifiers or include components operable to detect identifiers. For example, the communication components 1064 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:
1. A computer implemented method comprising:
   receiving, on a first network site, a query for an item of a particular item class, the first network site configured to display listings using a first user interface (UI) tax- onomy, the first UI taxonomy having categories that
describe items of different item classes;
determining, using one or more processors of a machine, that the queried item is associated with a second UI taxonomy different from the first UI taxonomy, the second UI taxonomy having a hierarchy of categories associated with a second network site that are specific to the particular item class of the queried item;
retrieving, using a search engine, a set of search results that match the queried item; and
causing, on a client device that submitted the query, a presentation that includes the set of search results and the second UI taxonomy, the second UI taxonomy configured to filter the set of search results in response to one or more user inputs received through the second UI taxonomy in the presentation and in accordance with the hierarchy of categories associated with the second network site.

2. The method of claim 1, wherein the particular item class is at least one of an item model or an item make.

3. The method of claim 1, wherein the second UI taxonomy is a UI taxonomy from the second network site different from the first network site, the second network site associated with a company that manufactures the particular item class of the queried item.

4. The method of claim 3, wherein the second network site has a second look-and-feel scheme different from a first look-and-feel scheme of the first network site, and wherein the presentation displays the second UI taxonomy using the first look-and-feel scheme of the first network site that received the query for the item.

5. The method of claim 1, further comprising:
receiving a user input selecting a category of the hierarchy of categories of the second UI taxonomy, wherein the category is specific to the particular item class of the queried item;
filtering the set of search results based at least in part on the user input; and
causing, on the client device, a second presentation that includes the set of search results filtered according to the user input.

6. The method of claim 5, wherein each search result of the set of search results comprises an item listing matching the queried item, the item listing including metadata that describes which categories of the hierarchy of categories of the second UI taxonomy apply to the item listing.

7. The method of claim 1, wherein the second UI taxonomy includes additional online content describing the particular item class.

8. The method of claim 7, wherein the additional online content includes at least one of: a slideshow, a video, an online article, listings published to the first network site for items of the particular item class, or a canvas area configured to receive live updates from other network sites.

9. The method of claim 1, wherein the second UI taxonomy includes user-supplied categories.

10. The method of claim 9, wherein the user-supplied categories are received from an additional client device associated with a manufacturer of the particular item class.

11. The method of claim 1, wherein the query is received through a UI search element displayed on a page of the first network site.

12. The method of claim 1, wherein the query is generated in response to a user selecting an image displayed on a page of the first network site.

13. The method of claim 1, further comprising:
identifying, on the second network site, the hierarchy of categories that are specific to the particular item class; and
generating the second UI taxonomy based at least in part on the hierarchy of categories associated with the particular item class.

14. A system comprising:
one or more processors of a machine; and
a memory storing instructions that, when executed by the one or more processors, cause the machine to perform operations comprising:
receiving, on a first network site, a query for an item of a particular item class, the first network site configured to display listings using a first user interface (UI) taxonomy, the first UI taxonomy having categories that describe items of different item classes;
determining, using the one or more processors of the machine, that the queried item is associated with a second UI taxonomy different from the first UI taxonomy, the second UI taxonomy having a hierarchy of categories associated with a second network site that are specific to the particular item class of the queried item;
retrieving, using a search engine, a set of search results that match the queried item; and
causing, on a client device that submitted the query, a presentation that includes the set of search results and the second UI taxonomy, the second UI taxonomy configured to filter the set of search results in response to one or more user inputs received through the second UI taxonomy in the presentation and in accordance with the hierarchy of categories associated with the second network site.

15. The system of claim 14, wherein the particular item class is at least one of an item model or an item make.

16. The system of claim 14, wherein the second UI taxonomy is a UI taxonomy from the second network site different from the first network site, the second network site associated with a company that manufactures the particular item class of the queried item.

17. The system of claim 16, wherein the second network site has a second look-and-feel scheme different from a first look-and-feel scheme of the first network site, and wherein the presentation displays the second UI taxonomy using the first look-and-feel scheme of the first network site that received the query for the item.

18. The system of claim 14, the operations further comprising:
receiving a user input selecting a category of the hierarchy of categories of the second UI taxonomy, wherein the category is specific to the particular item class of the queried item;
filtering the set of search results based at least in part on the user input; and
causing, on the client device, a new presentation that includes the set of search results filtered according to the user input.

19. A non-transitory machine-readable storage device embodying instructions that, when executed by a machine, cause the machine to perform operations comprising:
receiving, on a first network site, a query for an item of a particular item class, the first network site configured to display listings using a first user interface (UI) taxonomy, the first UI taxonomy having categories that describe items of different item classes;
determining, using one or more processors of the machine, that the queried item is associated with a second UI taxonomy different from the first UI taxonomy, the second UI taxonomy having a hierarchy of categories associated with a second network site that are specific to the particular item class of the queried item;

retrieving, using a search engine, a set of search results comprising a plurality of item listings that match the queried item; and causing, on a client device that submitted the query, a presentation that includes the set of search results comprising the plurality of item listings and the second UI taxonomy, the second UI taxonomy configured to filter the set of search results in response to one or more user inputs received through the second UI taxonomy in the presentation and in accordance with the hierarchy of categories associated with the second network site.

20. The non-transitory machine-readable storage device of claim 19, wherein the particular item class is at least one of an item model or an item make; and wherein the second UI taxonomy is a UI taxonomy from the second network site different from the first network site, the second network site associated with a company that manufactures the particular item class of the queried item.

* * * * *